United States Patent
Zhu

(10) Patent No.: US 8,983,008 B2
(45) Date of Patent: *Mar. 17, 2015

(54) METHODS AND APPARATUS FOR TAIL TERMINATION OF TURBO DECODING

(75) Inventor: Jianbin Zhu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/975,343

(22) Filed: Dec. 21, 2010

(65) Prior Publication Data

US 2011/0150146 A1   Jun. 23, 2011

Related U.S. Application Data

(60) Provisional application No. 61/289,921, filed on Dec. 23, 2009, provisional application No. 61/289,958, filed on Dec. 23, 2009, provisional application No. 61/292,801, filed on Jan. 6, 2010, provisional application No. 61/301,046, filed on Feb. 3, 2010.

(51) Int. Cl.
*H04L 27/06*  (2006.01)
*H04L 1/00*   (2006.01)

(52) U.S. Cl.
CPC .............. *H04L 1/005* (2013.01); *H04L 1/006* (2013.01)
USPC ........................................ 375/341; 714/792

(58) Field of Classification Search
CPC ... H04L 1/005; H04L 1/006; H03M 13/2957; H03M 13/3723; H03M 13/395
USPC .................. 375/341; 714/792, 752, E11.032
See application file for complete search history.

(56) References Cited

U.S. PATENT DOCUMENTS

| | | | |
|---|---|---|---|
| 5,761,248 | A  | 6/1998 | Hagenauer et al. |
| 6,578,892 | B2 | 6/2003 | Tsimmerman |
| 6,594,792 | B1 | 7/2003 | Hladik et al. |
| 6,675,342 | B1 | 1/2004 | Yagyu |
| 6,686,853 | B2 | 2/2004 | Shen et al. |
| 6,693,566 | B2 | 2/2004 | Jaffe et al. |
| 6,708,948 | B2 | 3/2004 | Nosel |
| 6,718,504 | B1 | 4/2004 | Coombs et al. |
| 6,738,948 | B2 | 5/2004 | Dinc et al. |
| 6,745,352 | B2 | 6/2004 | Cheng |
| 6,898,254 | B2 | 5/2005 | Wolf et al. |
| 6,982,659 | B2 | 1/2006 | Shen et al. |
| 6,993,704 | B2 | 1/2006 | Wolf |
| 7,185,260 | B2 | 2/2007 | Coombs et al. |
| 7,200,799 | B2 | 4/2007 | Wang et al. |
| 7,242,726 | B2 | 7/2007 | Cameron et al. |
| 7,254,190 | B2 | 8/2007 | Kwentus et al. |
| 7,260,766 | B2 | 8/2007 | Levy et al. |
| 7,331,012 | B2 | 2/2008 | Vasic et al. |
| 7,331,015 | B2 | 2/2008 | Hays et al. |

(Continued)

OTHER PUBLICATIONS

Ji-Hoon Kim and In-Cheol Park,"Double-Binary Circular Turbo Decoding Based on Border Metric Encoding", Jan. 2008, IEEE.*

(Continued)

*Primary Examiner* — Aristocratis Fotakis

(57) ABSTRACT

Methods and apparatus for trellis termination of a turbo decoder are disclosed which simplifies the hardware implementation. As a given example, backward state metrics, which is required to be calculated with forward state metric as part of a constitute decoding, are initialized with pre-calculated values based on input bits.

12 Claims, 2 Drawing Sheets

(56) References Cited

U.S. PATENT DOCUMENTS

| | | | |
|---|---|---|---|
| 7,657,819 B2 | 2/2010 | Berkmann et al. | |
| 7,849,377 B2 | 12/2010 | Hekstra et al. | |
| 8,250,448 B1 | 8/2012 | Andrews | |
| 8,341,506 B2 | 12/2012 | Li et al. | |
| 8,468,428 B1 | 6/2013 | Matache | |
| 2002/0174401 A1* | 11/2002 | Wang et al. | 714/786 |
| 2002/0184596 A1 | 12/2002 | Dinc et al. | |
| 2005/0022101 A1 | 1/2005 | Malm et al. | |
| 2005/0149836 A1* | 7/2005 | Tanaka | 714/794 |
| 2006/0158568 A1 | 7/2006 | Kaylani et al. | |
| 2007/0061666 A1* | 3/2007 | Nakai | 714/755 |
| 2007/0067703 A1 | 3/2007 | Berkmann et al. | |
| 2007/0101231 A1 | 5/2007 | Kutz et al. | |
| 2007/0234180 A1 | 10/2007 | Edmonston et al. | |
| 2008/0092010 A1 | 4/2008 | Orio | |
| 2008/0270868 A1* | 10/2008 | Shinagawa et al. | 714/752 |
| 2009/0019332 A1* | 1/2009 | Hekstra et al. | 714/752 |
| 2009/0049358 A1 | 2/2009 | Jalloul et al. | |
| 2009/0089643 A1 | 4/2009 | Hsieh | |
| 2009/0300463 A1* | 12/2009 | Purkovic et al. | 714/755 |
| 2011/0055657 A1 | 3/2011 | Charpentier et al. | |
| 2011/0066913 A1* | 3/2011 | Kang et al. | 714/752 |
| 2011/0107019 A1* | 5/2011 | Pan et al. | 711/104 |
| 2013/0156133 A1 | 6/2013 | Gentile et al. | |
| 2013/0235957 A1 | 9/2013 | El Khamy et al. | |
| 2014/0064413 A1 | 3/2014 | Huebner et al. | |

OTHER PUBLICATIONS

Notice of Allowance received for U.S. Appl. No. 12/973,951, mailed on Aug. 15, 2014, 5 pages of Notice of Allowance and 3 pages of Notice of Reference cited (information purpose only).

Notice of Allowance received for U.S. Appl. No. 13/608,720, mailed on Aug. 27, 2014, 5 pages of Notice of Allowance and 2 pages of Notice of Reference cited (information purpose only).

* cited by examiner

METHODS AND APPARATUS FOR TAIL TERMINATION OF TURBO DECODING

RELATED APPLICATIONS

This patent claims priority from U.S. Provisional Application Ser. No. 61/289,921 entitled "A method of trellis termination handling in turbo decoder" which was filed on Dec. 23, 2009; U.S. Provisional Application Ser. No. 61/289,958 entitled "A simple and efficient early stop scheme for turbo decoder" which was filed on Dec. 23, 2009; U.S. Provisional Application Ser. No. 61/292,801 entitled "A UMTS turbo decoder with multiple MAP engines" which was filed on Jan. 6, 2010; and U.S. Provisional Application Ser. No. 61/301,046 entitled "A contention free memory structure and interleaver for parallel HSPA_LTE turbo decoder" which was filed on Feb. 3, 2010. Each of U.S. Provisional Patent Application Ser. Nos. 61/289,958, 61/292,801, 61/289,921 and 61/301,046 is hereby incorporated by reference in its entirety.

FIELD OF THE DISCLOSURE

This disclosure relates generally to receivers for communication systems, and, more particularly, to methods and apparatus to perform turbo decoding for communications receivers.

BACKGROUND

Communications Systems widely adopt error correction coding techniques to combat with error introduced by interference and noise. FIG. 1 illustrates a typical communication system with error correction techniques which comprises an error correction encoder 100 at transmitter and a decoder 110 at receiver. The class of error control codes, referred to as turbo codes, offers significant coding gain for power limited communications channels. UMTS standards defined turbo codes for WCDMA specifications and LTE specification using identical constituent recursive convolutional codes with the difference of interleaver design. A tail sequence of 12 bits are used to terminate the trellis to enforce the state to zero state.

Turbo codes are decoded by iterative decoding algorithms. The BCJR algorithm which is based on maximum a posteriori (MAP) decoding needs to compute forward state metric calculation and backward state metric calculations [1]. Multiple iterations of MAP decoding are performed to gradually improve the decoding reliability.

Conventional turbo decoder design treats tails bit identically as information and parity bits to compute the backward state metrics. For UMTS turbo code, the 6 tails bits for each constituent decoder are treated as 3 additional trellis stages for decoding. At each iteration, the state metric initial stage computation is repeated although no additional information is provided. This problem is especially complicated in LTE turbo code, where the block size is always defined as multiple of two and radix-4 turbo decoding can be applied. In radix-4 decoding, each decoding stage generates 2 extrinsic information and process two trellis stages instead of one from normal radix-2 decoding. Since the number of stage for trellis termination is 3, special handling has to be done for backward metric calculation since the number of stage of trellis termination is not dividable by 2.

[1] L. Bahl, J. Cocke, F. Jelinek, and J. Raviv, "Optimal Decoding of Linear Codes for minimizing symbol error rate", IEEE Transactions on Information Theory, vol. IT-20 (2), pp. 284-287, March 1974.

DETAILED DESCRIPTION

Figure 1:
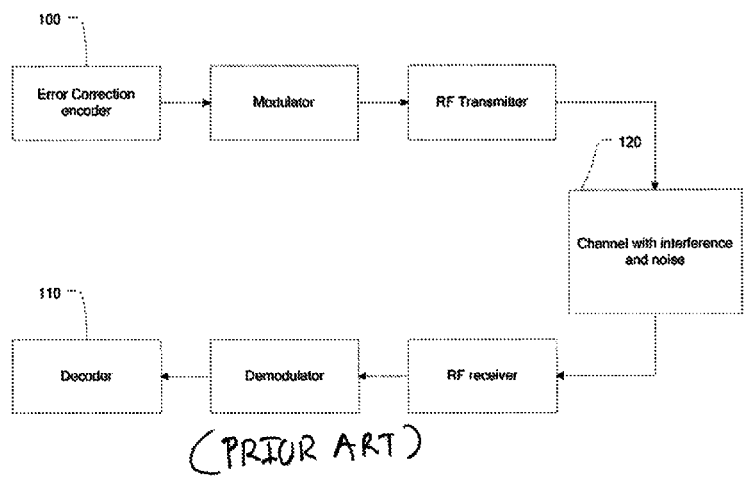
FIG. 1 illustrates a communications system with error correction coding.
Figure 2:
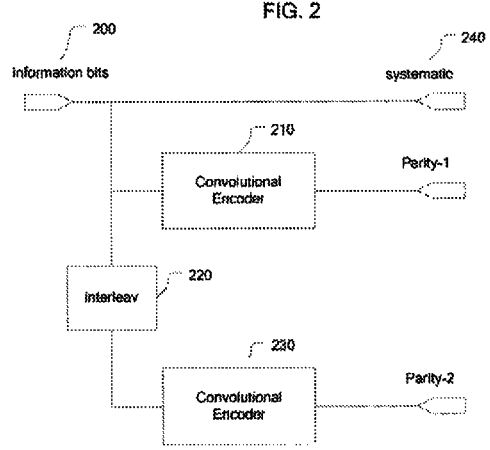
FIG. 2 illustrates a block diagram of turbo code.

As illustrated in FIG. 2, turbo codes consist of two constituent recursive convolutional codes. The information bits are first encoded by a recursive systematic convolutional encoder 210, and the interleaved version 220 of the information bits are encoded again by the same type of convolutional encoder 230. The resultant parity bits of the first encoder, the second encoder and the systematic information bits itself are transmitted over the communications channels.

Figure 3:
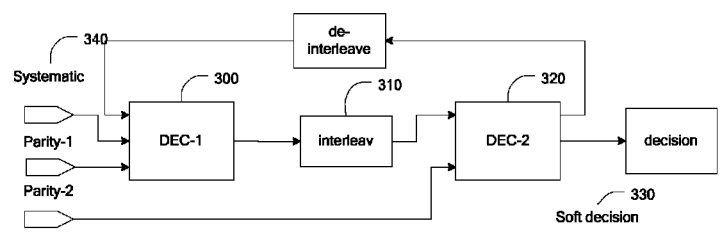
FIG. 3 illustrates an iteration decoding algorithm for turbo codes.

The decoding algorithm of turbo codes is known as iterative decoding algorithm. The block diagram of an example iterative decoding algorithm is illustrated in FIG. 3. In a decoding iteration, two soft-input, soft-output decoders are employed. The output of the first decoder 300 is feed into the second decoder as input after interleaving. Similarly, the output of the second decoder 320 is feed into the first decoder as input. A decoding iteration is completed by passing information once between the DEC-1 300 to DEC-2 320 and DEC-2 320 to DEC-1 310. For each soft-input soft-output decoder, the MAP decoding algorithms which generates maximum a posterior probability of the information bits are usually used. The MAP decoder takes soft input of systematic bits, and parity bits. It computes the soft-output of the systematic bits using the trellis structure of the convolutional code. The soft-output is called a posterior information. At the same time, the extrinsic information is also calculated which is defined as the contribution of information from the current decoding process alone. The extrinsic information is de-interleaved before passing to the next decoding stage. In the next decoding stage, the extrinsic information is utilized as a priori information of the systematic bits and added together with the systematic information bits before decoding. This type of iteration is repeated multiple times before the final results are given as the output. To achieve a good performance of turbo decoding, multiple decoding iterations are required.

Conventional turbo decoder design treats the tail bit as regular systematic and parity bits to calculate the forward and backward state metric computation. The tail bits are used repeatedly at each iteration although no additional information is provided from one iteration to another. This calculation is especially difficult for LTE radix-4 decoder since the number of trellis termination stage is 3 which is not dividable by 2 implied by the radix-4 decoding. Specially handing is required for the tail bits.

This disclosure presents a method to pre-compute the initial values of backward state metric. These metrics are identical from one iteration to another. Therefore, pre-computation is preferred and these values can be stored for further iteration use. The initial values are computed purely from the input signal. In the example of UMTS turbo decoding, The 8 initial values called beta values need to be calculated as follows:

$$\begin{cases} \beta_{k+0}(0) = \gamma_{k+3}^{00} + \gamma_{k+2}^{00} + \gamma_{k+1}^{00} \\ \beta_{k+0}(1) = \gamma_{k+3}^{00} + \gamma_{k+2}^{00} + \gamma_{k+1}^{11} \\ \beta_{k+0}(2) = \gamma_{k+3}^{00} + \gamma_{k+2}^{11} + \gamma_{k+1}^{10} \\ \beta_{k+0}(3) = \gamma_{k+3}^{00} + \gamma_{k+2}^{11} + \gamma_{k+1}^{01} \\ \beta_{k+0}(4) = \gamma_{k+3}^{11} + \gamma_{k+2}^{10} + \gamma_{k+1}^{01} \\ \beta_{k+0}(5) = \gamma_{k+3}^{11} + \gamma_{k+2}^{10} + \gamma_{k+1}^{10} \\ \beta_{k+0}(6) = \gamma_{k+3}^{11} + \gamma_{k+2}^{01} + \gamma_{k+1}^{11} \\ \beta_{k+0}(7) = \gamma_{k+3}^{11} + \gamma_{k+2}^{01} + \gamma_{k+1}^{00} \end{cases} \quad \text{Equation 1}$$

Where $\beta_k(s)$ is the backward state metric for state s of k-th bit in logarithm domain and $\gamma_k^{uv}$ is the branch metric associated with the state transition that produces systematic bit u and parity bit v in logarithm domain.

For LTE turbo decoding using radix-4 decoder, this algorithm is especially useful since the code block size is always a multiple of 2, no additional boundary consideration is required to calculate the 3 trellis termination stages. The backward state metrics can be directly initialized from the stored values pre-computed.

What is claimed is:

1. A receiver device comprising a plurality of maximum a posteriori decoders configured to iteratively compute one or more received input signal sequences, the decoders configured to:
    calculate backward state initial values from an input signal,
    store the backward state initial values as a pre-computed backward state metric into a memory;
    for each iteration of a plurality of iterations, the decoders are further configured to:
    compute a forward state metric;
    compute a backward state metric,
    wherein for each of the plurality of iterations for calculating the backward state metric, the decoders are configured to retrieve from the memory, the initial state values of the backward state metric, and wherein the initial values of the backward state metric are pre-computed from the received input signal independent of the plurality of decoding iterations.

2. The receiver device according to claim 1, comprising iterative decoding for turbo codes.

3. The receiver device according to claim 1, comprising radix-4 decoder for turbo codes defined by LTE standard, wherein the said decoder produces two extrinsic information bits at each state transition.

4. The receiver of claim 1,
    wherein each said decoding iteration is substantially identical.

5. The receiver of claim 1, wherein the plurality of maximum a posteriori decoders are configured as a turbo decoder.

6. The receiver of claim 1, wherein the plurality of maximum a posteriori decoders are configured as a radix-4 decoder.

7. The receiver of claim 1, wherein at least one of said plurality of iterations further comprises extrinsic information.

8. A method for tail termination in a receiver comprising a plurality of maximum a posteriori decoders and configured to iteratively compute a received input signal sequences, the method comprising:
    calculating, by the decoders, backward state initial values from an input signal,
    storing, by the decoders, the backward state initial values as a pre-computed backward state metric into a memory;
    for each of a plurality of decoding iterations, the method further comprising
    calculating, by the decoders, a forward state metric;
    calculating, by the decoders, a backward state metric,
    wherein for each of the plurality of decoding iterations for calculating the backward state metric, fetching the pre-computed backward state metric from the memory as an initial backward state metric, wherein the initial backward state metric is pre-computed independent of said plurality of decoding iterations.

9. The method of claim 8, wherein each of the plurality of decoding iterations is substantially identical.

10. The method of claim 8, wherein the plurality of maximum posteriori decoders are configured as a turbo decoder.

11. The method of claim 8, wherein the plurality of maximum posteriori decoders are configured as a radix-4 decoder.

12. The method of claim 8, wherein at least one of said plurality of decoding iterations further comprises extrinsic information.

* * * * *